United States Patent [19]
Hill

[11] 3,796,979
[45] Mar. 12, 1974

[54] STANDARD ELECTRIC UTILITY CURRENT TRANSFORMER COMPARTMENT

[75] Inventor: William K. Hill, St. Louis, Mo.

[73] Assignee: Westinghouse Electric Corporation, Pittsburgh, Pa.

[22] Filed: Mar. 15, 1973

[21] Appl. No.: 341,641

[52] U.S. Cl............... 336/67, 336/92, 336/192
[51] Int. Cl................ H01f 27/06, H01f 15/10
[58] Field of Search........... 336/65, 67, 68, 92, 192; 317/99, 122

[56] References Cited
UNITED STATES PATENTS

| | | | |
|---|---|---|---|
| 1,132,297 | 3/1915 | Apple | 336/67 |
| 3,185,424 | 5/1965 | Sloop | 336/65 |
| 3,740,614 | 6/1973 | Baso et al. | 317/99 |

*Primary Examiner*—Thomas J. Kozma
*Attorney, Agent, or Firm*—H. G. Massung

[57] ABSTRACT

A standard utility current transformer compartment is provided for mounting various commonly used current transformers. The invention meets the common utility requirements of a barriered, sealable, dimensionally standard compartment which is acceptable to most electric utility companies. The disclosed current transformer compartment allows for initial mounting of almost all commonly used utility current transformers and permits interchangeability at any time, such as an emergency replacement, without field modification or additional costs. Generally, U-shaped flanged mounting brackets, formed from a conducting material such as aluminum or copper, are provided for mounting the current transformers and for electrically connecting line side and load side conductors to the current transformers. The electric utility current transformer compartment construction taught in the present invention can accommodate most of the commonly used utility current transformers in the 200 amp to 2,000 amp range. The current transformers are mounted between two of the generally U-shaped mounting brackets. The free ends of the legs of the U-shaped mounting bracket have outward facing flanges. The flanges of the U-shaped brackets are connected to an insulating support base. Various hole patterns are provided in the U-shaped bracket to accommodate the various current transformers. Other openings are provided in the U-shaped bracket to facilitate attachment of conducting bus or cable as required.

5 Claims, 6 Drawing Figures

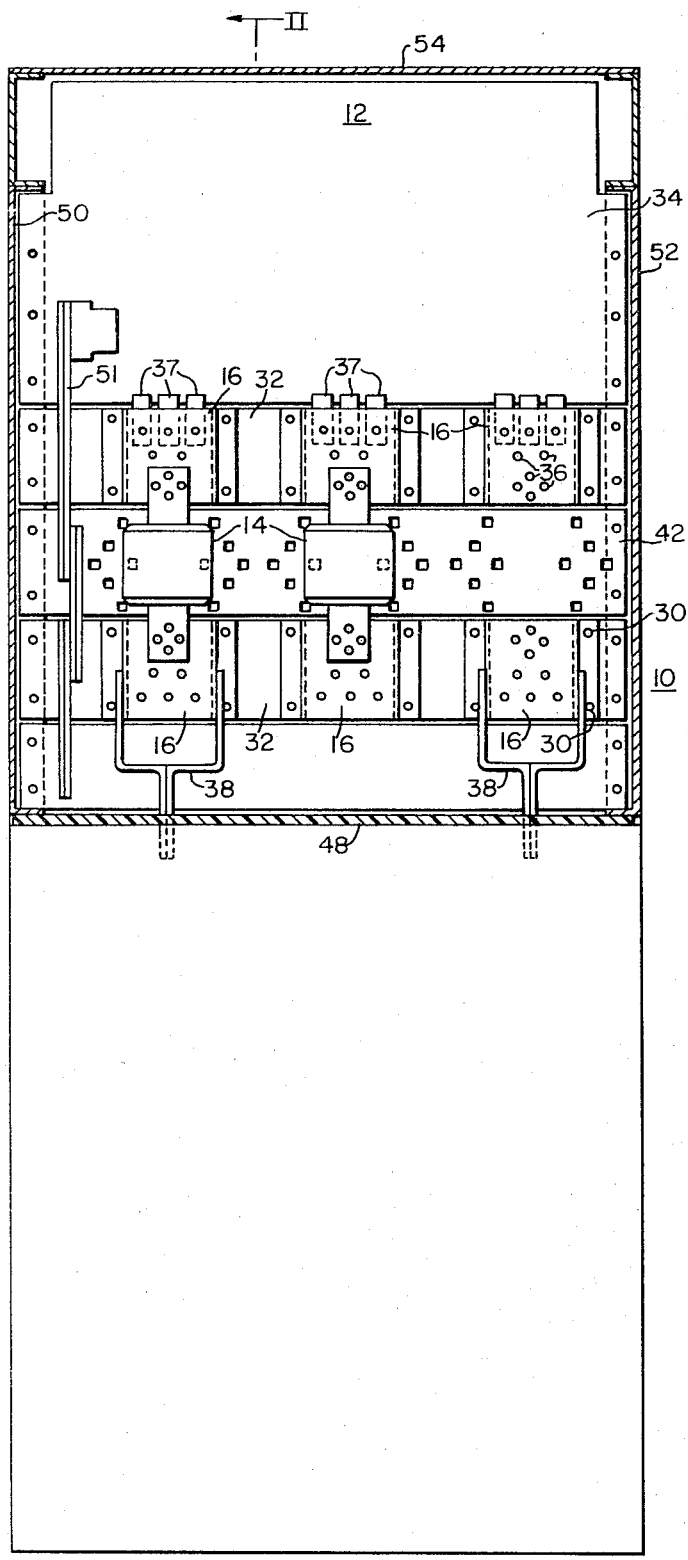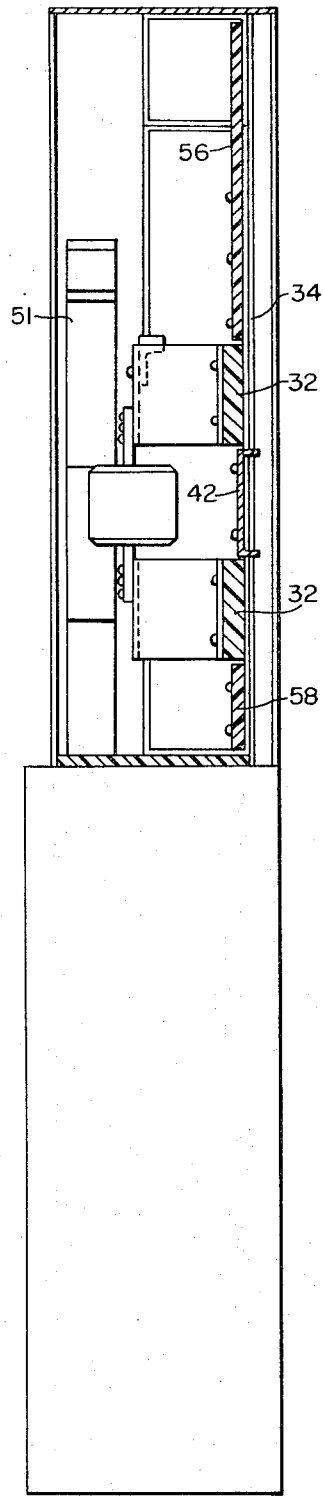
FIG. 1
FIG. 2

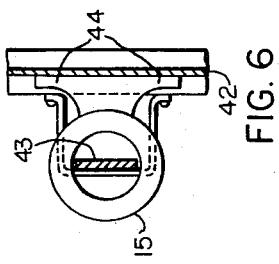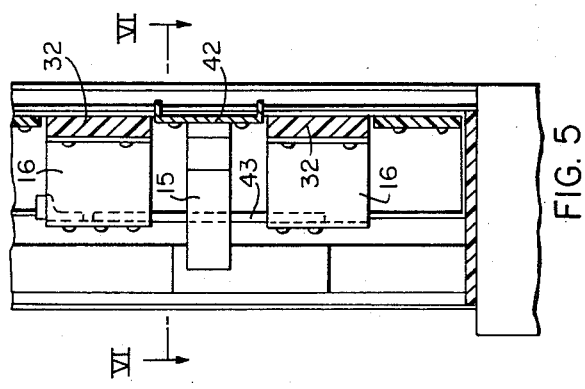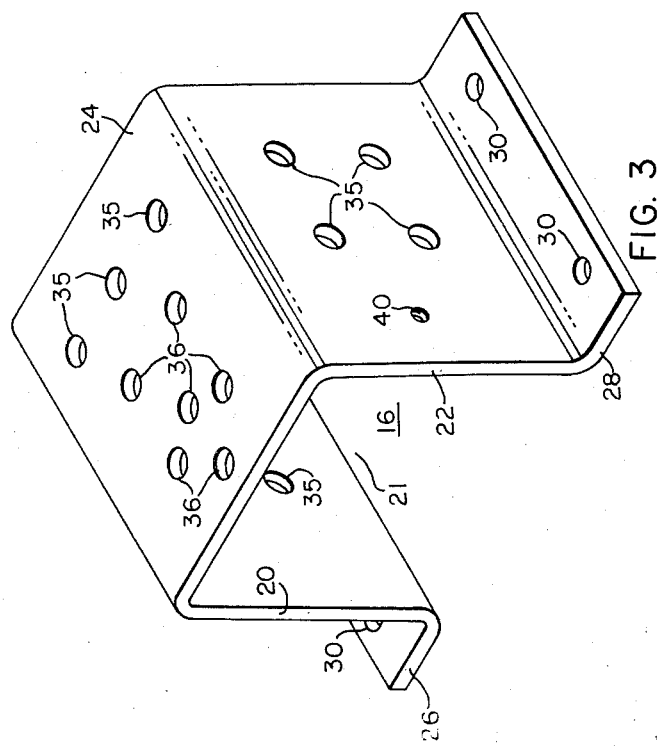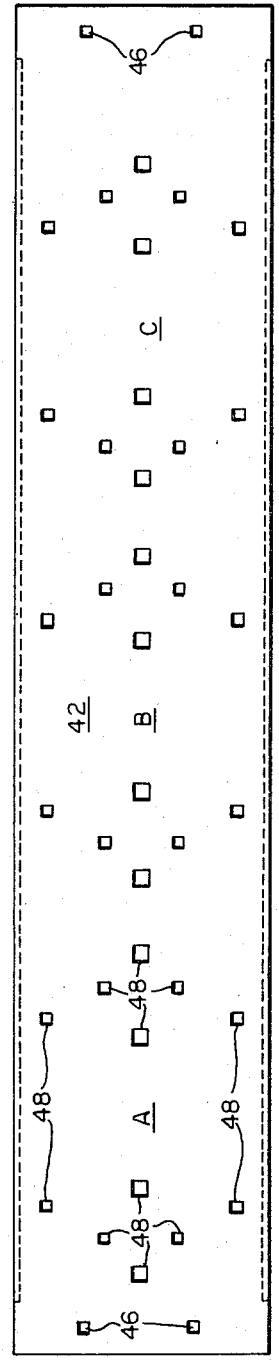

STANDARD ELECTRIC UTILITY CURRENT TRANSFORMER COMPARTMENT

BACKGROUND OF THE INVENTION

This invention relates generally to switchgear and more particularly to metal enclosed switchgear of a type suitable for relatively low voltage distribution service. More specifically this invention relates to the construction of a utility current transformer compartment which frequently forms a part of such metal enclosed switchgear units.

A metal enclosed switchgear installation usually includes one or more units with each unit consisting of a plurality of sections or cells. The sections are assembled side by side to provide a unit or switchgear assembly capable of housing a desired number of circuit breakers or other circuit controlling devices. The maximum number of sections assembled in a unit at a factory is usually governed by the handling and shipping facilities available.

Switchgear installations are frequently supplied with power directly from an electric utility company. In these installations, a current transformer compartment for mounting the current transformers necessary to meter the power supplied is normally required. It is common industry practice to fabricate the prior art current transformer sections strictly in line with the specifications provided by each electric utility company. This results in numerous dissimilar current transformer compartments for the various electric utility companies.

Meeting individual specifications for each utility company requires costly engineering time, hand fabrication of various parts and individual assembly of the current transformer compartment. Other problems caused by this practice are: utility approval is required on a job by job basis, long delivery lead times are necessary and possible construction delays sometime result. All of the above mentioned occurrences are extremely costly and undesirable from an economic and standardization viewpoint. The practice of fabricating utility current transformer compartments on a job by job basis also prevents the electric utility companies from interchanging various different commonly used current transformers as might be necessary when emergency replacement is required.

SUMMARY OF THE INVENTION

In accordance with the invention, a metal enclosed switchgear installation is provided with a barriered, sealable, current transformer compartment which is dimensionally acceptable to most of the electric utility companies. The disclosed current transformer compartment meets the requirements of various utility specifications using one set of common components and eliminates the necessity for numerous special designs.

For each current transformer to be mounted in the current transformers compartment a pair of spaced apart generally U-shaped mounting brackets are provided. Each current transformer is mounted between an associated pair of U-shaped brackets. Outward facing flanged portions are formed at the open ends of the legs of the U-shaped mounting brackets. The required U-shaped brackets act as a connector and support for the current transformer and as a terminal point for the primary conductors leading into and out of the current transformer.

The U-shaped bracket is formed with a flat bight portion between the two legs of the U. The required U-shaped members are attached by the outward projecting flanges to insulating base support members. Each current transformer compartment is normally supplied with two insulating mounting bracket support members, disposed horizontally in a spaced apart relationship, across the back of the compartment. A current transformer mounting pan is disposed in the vertical space between the spaced apart insulating support bases. The current transformer mounting pan has multiple mounting holes formed therein so that most of the window type current transformers commonly used by utilities can easily be mounted thereto.

Most of the commonly used bar type current transformers and window type current transformers can be supported on the U-shaped mounting bracket or the current transformer mounting pan supplied. The U-shaped bracket is formed from a conducting material such as copper or aluminum. The flanged portions of the U-shaped bracket are attached to the insulating support base and the flat bight portion is spaced from the insulating base support member. The primary terminals of the various bar type current transformers are connected between the flat bight portions of the two associated U-shaped conducting mounting brackets. A plurality of mounting holes are formed in the flat bight portion of the U-shaped bracket to accommodate various types of current transformers. The U-shaped mounting bracket is formed with additional multiple holes around the legs and bight portions of the bracket, opposite the end to which the current transformer is connected. These additional holes permit the mounting of many different combinations of line or load side conductors to the U-shaped brackets.

The U-shaped bracket is normally constructed from a ½ inch by 6 inch bus bar bent perpendicular to the longitudinal axis of the bus bar so as to form a flanged U-shaped bracket having a flat bight portion approximately 5 to ⅝ inches wide. The U-shaped brackets are disposed in the current transformer compartment so that the main opening forming the U-shape extends generally parallel to, and inline with, the primary terminals of a bar type current transformer or the opening through a window type current transformer. By so disposing the U-shaped bracket it can easily carry currents up to 2,000 amps without excess heating.

The current transformer section constructed as taught permits the use of both primary bar and window type current transformers. The primary bar type current transformer is mounted between and supported by the U-shaped conducting bracket. The window type current transformer is mounted on support feet which are bolted to the current transformer support pan. The disclosed construction of current transformer compartments meets the requirements of various utility specifications, using one set of permanent components and eliminates the necessity for numerous special designs. The disclosed current transformer compartment allows initial mounting of almost all commonly used 200 ampere to 2,000 ampere current transformers; and permits interchangeability at any time when emergency replacement necessitates, without field modification or additional costs. The current transformer compartment disclosed features a low cost readily available construction requiring only initial utility approval, and eliminates construction delays while waiting for utility consideration.

The hole patterns formed in the U-shaped bracket and the current transformer mounting pan permit the mounting of the most commonly used current transformers of various manufacturers normally used by utility companies. This standardization of components using minimum parts allow for better tooling and mass production resulting in a better quality lower cost product. The availability of the current transformer mounting compartment is thus off the shelf. By obtaining initial utility approval the necessity for factory drawings for specific jobs is eliminated and delays are minimal. The transformer mounting bracket allows and has provisions for mounting up to and including 6–750 MCM terminals, the standard hole pattern provided, also allows for bus bar feed and adapters up to and including the maximum amp capacity of the current transformer mounting bracket.

An important object of my invention is to provide a current transformer compartment able to accept and mount most of the current transformers used by the electric utility companies without modification.

Another object of my invention is to provide a switchboard current transformer compartment formed from a few standard off-the-shelf items which can be easy and inexpensive to manufacture and assemble.

Another object of the present invention is to provide a neat standardized switchboard current transformer compartment which may be manufactured utilizing assembly line techniques and which may be readily assembled from off the shelf items to provide a current transformer compartment acceptable to a majority of the electric utility companies.

A still further object of my invention is to provide a current transformer compartment in which a defective current transformer can be quickly and easily replaced by an electric utility company with another current transformer either of the same type or of another variety without any field modification of the current transformer compartment.

BRIEF DESCRIPTION OF THE DRAWINGS

For a better understanding of the invention, reference may be had to the preferred embodiment exemplary of the invention shown in the accompanying drawings, in which:

FIG. 1 is a front view of a switchboard unit having a current transformer compartment utilizing the teaching of the present invention;

FIG. 2 is a view of a portion of the switchboard shown in FIG. 1 along the line II—II;

FIG. 3 is a perspective view of the U-shaped bracket used for mounting the current transformers as shown in FIG. 1;

FIG. 4 is a top view of the current transformer mounting pan shown in FIG. 1;

FIG. 5 is a view similar to FIG. 2 showing a window type current transformer in place and mounted to the current transformers mounting pan and FIG. 6 is a view of a portion of the switchboard shown in FIG. 5 along the line VI—VI.

DESCRIPTION OF THE PREFERRED EMBODIMENT

Referring now to the drawings and FIGS. 1 and 2 in particular, there is shown a switchgear unit 10 having a current transformer compartment 12 embodying the teachings of the present invention. The current transformer compartment 12 is mounted at the top of the switchgear section 10 and in the unit shown is constructed for housing three current transformers 14 as would be required in a common three phase alternating current power distribution system. Current transformers 14 are mounted between a pair of generally U-shaped flanged brackets 16.

The mounting bracket 16 which is an important part of the present invention is shown in more detail in FIG. 3. The generally U-shaped bracket 16 comprises two leg portions 20 and 22 connected by a flat bight portion 24. Outward facing flange portions 26 and 28 extend from the free end of legs 20 and 22 respectively. Mounting holes 30 are formed in the flange portions 26 and 28 to facilitate attachment of the U-shaped bracket 16 to the backwall 34 of current transformer compartment 12. Horizontally extending insulating support bases 32, having a flat foward facing surface, form part of the back wall 34 of current transformer compartment 12. Each U-shaped bracket 16 is attached to an insulating support base 32 by fastening means passing through mounting holes 30.

For each current transformer 14 to be mounted in current transformer compartment 12 two U-shaped mounting brackets 16 are required. The pair of U-shaped brackets are disposed in the current transformer compartment 12 in a spaced apart relationship with the openings 21 formed by the U-shaped brackets in alignment with the primary current transformer conductors. The current transformer 14 can then be mounted to each U-shaped bracket so as to be supported in the space between the pair of U-shaped brackets 16. Multiple mounting holes 36 are formed in the U-shaped bracket 16 to permit connection to most of the primary bar type current transformers 14 commonly used by utilities in the 200 to 2,000 ampere range. When primary bar type current transformers 14 are mounted in current transformer compartments 12 the associated U-shaped brackets 16 make electrical connection with and mechanically supports the current transformers 14. The hole 36 pattern formed in U-shaped bracket 16 permits easy mounting of several different types of primary bar type current transformers 14 in the current transformer compartment 12. Near the edge of the bight portion 24 of mounting bracket 16 opposite the point where mounting holes 36 are formed and in legs 20 and 22, a plurality of holes 35 for connecting to terminal lugs 37 are provided. Holes 35 formed in U-shaped bracket 16, or other conductors, can be used for connecting terminal lugs 37 or bus conductors to the U-shaped bracket.

Current carrying capacity of a conductor such as U-shaped bracket 16 if used to conduct power from a portion such as flange 26 to another portion such as flange 28 is normally calculated on a density basis and can be determined by UL or NEMA standards. For example, if the U-shaped bracket 16 is formed from a ¼ inch by 6 inch aluminum bus bar rated at 750 amps per square inch, it would be rated at 1,125 amps determined by multiplying 0.25 inches times 6.0 inches times 750 amps. However, if current is fed into both legs 20 and 22, of the U-shaped bracket and taken off at the bight portion 24 the ampacity of a U-shaped bracket formed from a ¼ by 6 inch bus bar rated at 750 amps per square inch, would be equal to 2,250 amperes. This symmetrical or double feeding doubles the current capacity of the U-shaped bracket 16. It has been verified experimentally that by symmetrically balancing the power into and out of the U-shaped bracket 16, an acceptable temperature rise can be obtained for current ratings over 2,000 amperes.

As can be seen in FIG. 1, the load side conductor of the current transformer compartment 12 can be formed from bus bars 38 attached to the legs 20 and 22 of the U-shaped bracket 16. The line side of the upper U-shaped brackets 16 can also be fed from cable or bus conductors as desired. U-shaped bracket 16 is constructed to allow for mounting up to and including six 750 MCM terminals in a symmetrical pattern. Two 750 MCM terminals can be connected to each of the leg portions 20 and 22 and two 750 MCM terminals can be mounted to the outside mounting holes 35 formed in the bight portion 24 of the U-shaped bracket 16. This will provide generally symmetrical split feeding to the primary terminal of current transformer 14 which is connected to the associated U-shaped bracket 16. Thus the U-shaped bracket provides for a compact low cost, high quality current transformer mounting and connecting means. A tapped 10–32 hole 40 is provided in the U-shaped bracket 16 to facilitate the connection of potential metering leads in the current transformer compartment. Various other combinations of bus and cable can easily be attached to the U-shaped bracket 16 to achieve the desired line and load connections.

As shown in FIG. 5 and FIG. 6, current transformer compartment 12 can also accommodate various window type current transformers 15. A current transformer mounting pan 42 is provided between the two insulating mounting bases 32. When a window type current transformer 15 is used, a primary bar 43 is supplied with the current transformer compartment 12. The window type current transformer 15 is mounted around the primary bar 43 and feet 44 provided on the current transformer 15 are bolted to the current transformer support pan 42.

A detailed view of the current transformer support pan 42 is shown in FIG. 4. As shown, three groups of mounting holes A, B and C, corresponding to the three phases in the system being shown, are provided in the top flat surface of the generally U-shaped support bracket 42. Holes 46 are formed in the ends of current transformer mounting pan 42 to facilitate attachment to the back 34 of current transformer compartment 12. Each group of holes A, B and C formed in the top of mounting pan 42 comprise a plurality of openings 48 for mounting the feet 44 of various window type current transformers 15 to mounting pan 42. Most of the common window type current transformers 15 used by the utility industry can be mounted to mounting pan 42 without any modification. Thus, it can be seen that the current transformer compartment 12 disclosed in the instant application, can accommodate most of the current transformers 14 or 15, either primary bar 14 or window type 15, used by the electric utility companies for measuring current in the 200 to 2,000 ampere range.

As can be seen from FIGS. 1 and 2, current transformer compartment 12 disclosed is barriered and sealable. The line side bus 42 passes out of the utility compartment, 12 by extending through openings formed in bottom insulating barrier 48. Two side walls 50 and 52 form the sides of current transformer compartment 12. When a neutral conductor 51 is required, it can be mounted from side wall 50 or 52 as desired. A top cover 54 is also provided and back cover members 56 and 58, along with a single hinge front door are provided to completely enclose current transformer compartment 12. The single hinge door with provision for padlocking is normally provided so as to give easy access to the transformer compartment 12 and to permit locking in the closed position. A double hinged door can also be provided when desired. The generally U-shaped mounting bracket 16 can be formed from a material having good electrical conducting characteristics such as copper or aluminum.

It can be seen that the current transformer compartment 12 is constructed from standardized parts, which can be kept as in-stock item. This allows rapid assembly of standardized current transformer compartment 12 from a few off-the-shelf items. This reduces costly engineering time, eliminates hand fabrication of parts and individual assembly of current transformer compartment 12. Standardization of components using minimum parts allows for tooling and mass production, resulting in a better quality lower cost product. By obtaining initial utility approval the necessity for factory drawings for specific jobs is eliminated and delays are minimized.

The disclosed construction of current transformer compartment 12 permits the interchangeability of various types of current transformers such as may be required when emergency replacement is necessary. The various current transformers can be quickly interchanged without any field modification or additional parts or cost. Most of the current transformers commonly used by the electric utility industry can be accommodated in the disclosed current transformer compartment 12. For example, some of the various types of primary bar type current transformers 14 which can be mounted in the compartment 12 without modification either to the compartment 12 or the current transformers 14 or 15 are: Westinghouse type CSB–10, RTM–10, CTR; General Electric type JCX–0, JCM–0, JCW–0, JKT–0; Astra electric type AA, BB, TA, TC; and Sangamo Electric type S–6, RF–6B, BH–6. Also most of the commonly used window type current transformers can be mounted in the disclosed compartment 12. For example some of the window type current transformer 15 which can be mounted in the disclosed current transformer compartment 12 are: Westinghouse type CLA-10, EMC; General Electric type JCP–0, JAD–0, JCS–0; Astra Electric type AB1000, AB2,000 ; and Sangamo Electric type WH–6. Thus it can be seen that a current transformer compartment 12 is provided for housing many different types of current transformers 14 or 15 and is constructed from a few stock off-the-shelf items.

I claim as my invention:

1. A compartment for housing current transformer means comrpising:
    a back wall at least a portion of which is formed from insulating material;
    a pair of generally U-shaped electrical conducting mounting brackets attached to insulating portions of said back wall in a spaced apart relationship;
    each of said U-shaped mounting brackets comprising a first leg portion, a second leg portion, and a bight portion connecting said first leg portion and said second leg portion; and said current transformer means disposed between said spaced apart pair of generally U-shaped mounting brackets with the primary electrical leads of said current transformer means extending between and being connected to the bight portions of said pair of generally U-shaped mounting brackets.

2. A compartment for housing current transformer means as claimed in claim 1, including:
a first flange portion, having mounting holes formed therein, formed at the free end of said first leg portion of said U-shaped mounting bracket and extending generally outward in a directly away from said second leg portion;
a second flange portion, having mounting holes formed therein, formed at the free end of said second leg portion of said U-shaped bracket and extending generally outward in a direction away from said first leg portion;
mounting means for connecting said first flange portion and said second flange portion of said U-shaped mounting bracket to an insulating portion of said back wall so, that said first flange portion and said second flange portion are flush with an insulating portion of said back wall.

3. A compartment for housing current transformer means as claimed in claim 2 wherein said back wall comprises:
a first insulating support member extending horizontally across said back wall and having a first flat forward facing surface,
a second insulating support member spaced apart from said first insulating support member and running substantially parallel to said first insulating support member across said back wall and having a second flat forward facing surface; and
one of said pair of generally U-shaped mounting brackets being attached to the first flat surface of said first insulating member and the other of said pair of generally U-shaped mounting brackets being attached to the second flat surface of said second insulating mounting member so as to form a space between said pair of U-shaped mounting brackets.

4. A compartment for housing current transformer means as claimed in claim 3 including:
a current transformer mounting pan disposed between said first insulating member and said second insulating member and having a plurality of holes formed therein; and
wherein said transformer means comprises mounting means attached to said transformer means and having a plurality of holes formed therein which align with some of the holes formed in said current transformer mounting pan.

5. A compartment for housing current transformer means as claimed in claim 1, wherein:
said current transformer means include primary bus bar conductors having a plurality of holes formed therein;
each of said bight portions of said U-shaped mounting brackets having multiple holes formed therein at least a portion of which align with a plurality of holes formed in said current transformer means to facilitate connection thereto; and
the first leg portion and the second leg portion of each of said U-shaped mounting brackets having a plurality of holes formed therein to facilitate the connection of electrical conductors to each U-shaped mounting bracket.

* * * * *